(No Model.)
W. SCHOTT.
SURGICAL KNIFE.
No. 380,698. Patented Apr. 10, 1888.
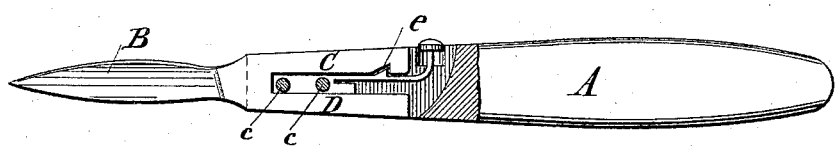
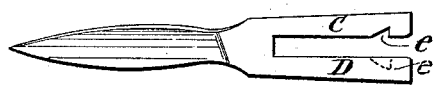
WITNESSES:
Robt. F. Gaylord
Ernest Hopkinson
INVENTOR,
William Schott
BY
Duncan, Curtis & Page
ATTORNEYS.

UNITED STATES PATENT OFFICE.

WILLIAM SCHOTT, OF BROOKLYN, NEW YORK.

SURGICAL KNIFE.

SPECIFICATION forming part of Letters Patent No. 380,698, dated April 10, 1888.

Application filed November 2, 1887. Serial No. 254,030. (No model.)

*To all whom it may concern:*

Be it known that I, WILLIAM SCHOTT, a citizen of the United States, residing at Brooklyn, in the county of Kings and State of New York, have invented certain new and useful Improvements in Surgical Instruments, of which the following is a specification, reference being had to the drawings accompanying and forming a part of the same.

This invention is primarily an improvement in surgical or dental instruments, the object of the invention being to provide an improved means of detachably fitting to a handle different blades or similar instruments, whereby one handle may answer for a number of different instruments. Although this is the original design of my invention, it is obviously applicable also to other forms of knives, tools, and the like.

The plan of using a single handle for different blades or tools, due provision being made for securing them together and readily detaching them, has long been practiced in many different ways; but my invention I conceive to be a substantially better and more convenient means for accomplishing the same object.

Physicians or surgeons and dentists, when using such implements as these, require a readily-detachable blade or tool which is strongly or firmly held in its place in the handle. The shape of the handle is of prime importance, and the presence of any device in the handle for securing and releasing the blade is a serious objection if it is in any way likely to form an obstruction to the free use of the handle or is of such character that it is likely to be accidentally pressed or turned or otherwise operated when it is not desired. The requirements of a device which entirely avoids the objections to the heretofore-existing handles I have secured in my improvement, in which a bifurcated handle contains a spring-catch operated by a push-button projecting slightly out from the handle, and a blade or tool with a bifurcated shank, which, when pushed into the slot in the end of the handle, receives the catch therein between its ends and is locked in place thereby. This is the general plan of construction. The details of the same I will now describe by reference to the accompanying drawings.

Figure 1 is a view of the handle and a blade combined, a portion of the former being cut away to exhibit the catch. Fig. 2 is a plan view of the handle. Fig. 3 is a side view of the catch for the handle. Fig. 4 is a top view of the same. Fig. 5 is a side view of the blade adapted for use with the handle.

A is a handle, of hard wood, rubber, or any other material, commonly employed in surgical instruments. After being given the desired shape for easy manipulation, a slot, E, is formed in its end, preferably by a saw. One end of this slot is widened on one side of the handle to form a recess, $f$. In this slot is then inserted a metal plate, G, which is held in place by screws or rivets $c\ c$, passing through the two parts or sides of the handle.

The plate G is formed with a resilient arm, H, the end of which is turned up and carries a button, F, which is located in the recess $f$ when the plate is in position, and which extends out above the surface of the handle to a slight extent.

On the upper edge of the arm H is a stop or tooth, $g$, beveled off on the side next the plate G and forming the catch proper for the blade. I sometimes cut a slot in the plate G under the arm H, whereby the length of the arm is increased and greater resiliency is obtained.

The blade or other tool, B, is made in the desired form, but with a flat bifurcated tang or shank, C D. The slot or space between the two ends of the shank is of just sufficient width to admit the plate G, and the width of the slot E is just sufficient to admit the shank of the blade B.

In one of the ends, as G, of the shank a notch, $e$, is formed, in such a position that when the shank of the blade is adjusted in position the catch $g$ will enter the notch and hold the blade in place. The plate G should fit closely up into the forward end of the slot in the shank, so as to prevent any vertical movement of the blade. The ends of the handle, between which the shank of the blade is held, prevent any side movement.

The blade is secured to the handle by simply inserting the shank therein until the notch $e$ and tooth $g$ are brought into engagement. To remove the blade, the button F is pressed until the tooth $g$ is forced out of engagement with the notch $e$. In this way I obtain a sure and firm connection between the blade and the handle, which may be established or severed with great ease. The construction is very greatly simplified and the number of parts reduced.

Without confining myself to the exact construction of the parts shown, what I claim is—

The combination, with the bifurcated or slotted handle, the metal plate G, secured therein, and the spring-arm H, bent and provided with button F, extending out through the handle, of the blade with a bifurcated shank adapted to fit into the slotted handle over the plate G and arm H, the shank and spring-arm being formed with engaging parts which lock the blade in place, as set forth.

Signed at New York the 29th day of October, 1887.

WILLIAM SCHOTT.

Witnesses:
ROBT. F. GAYLORD,
ERNEST HOPKINSON.